(12) United States Patent
Fukui et al.

(10) Patent No.: US 10,961,419 B2
(45) Date of Patent: Mar. 30, 2021

(54) LAYERED BODY AND METHOD FOR MANUFACTURING ELECTRONIC COMPONENT

(71) Applicant: DOW TORAY CO., LTD., Tokyo (JP)

(72) Inventors: Hiroshi Fukui, Ichihara (JP); Kyoko Toyama, Ichihara (JP); Yoshito Ushio, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 30 days.

(21) Appl. No.: 16/345,703

(22) PCT Filed: Oct. 26, 2017

(86) PCT No.: PCT/JP2017/038775
§ 371 (c)(1),
(2) Date: Apr. 27, 2019

(87) PCT Pub. No.: WO2018/079678
PCT Pub. Date: May 3, 2018

(65) Prior Publication Data
US 2019/0300767 A1    Oct. 3, 2019

(30) Foreign Application Priority Data
Oct. 31, 2016    (JP) .............................. JP2016-212742

(51) Int. Cl.
| | | |
|---|---|---|
| C09J 183/04 | (2006.01) | |
| B32B 7/02 | (2019.01) | |
| B32B 7/12 | (2006.01) | |
| B32B 27/00 | (2006.01) | |
| C08J 7/04 | (2020.01) | |
| B32B 7/025 | (2019.01) | |
| B32B 27/08 | (2006.01) | |
| B29C 65/00 | (2006.01) | |
| B32B 7/022 | (2019.01) | |
| B29C 65/76 | (2006.01) | |
| B29C 65/48 | (2006.01) | |

(Continued)

(52) U.S. Cl.
CPC .............. *C09J 183/04* (2013.01); *B32B 7/02* (2013.01); *B32B 7/12* (2013.01); *B32B 27/00* (2013.01); *C08J 7/042* (2013.01); *B29C 65/483* (2013.01); *B29C 65/486* (2013.01); *B29C 65/4855* (2013.01); *B29C 65/76* (2013.01); *B29C 66/41* (2013.01); *B32B 7/022* (2019.01); *B32B 7/025* (2019.01); *B32B 27/08* (2013.01); *B32B 27/16* (2013.01); *B32B 27/283* (2013.01)

(58) Field of Classification Search
CPC .. H01L 2924/00; H01L 23/296; C09J 183/04; C08J 7/042; B32B 13/04; B32B 15/04; B32B 15/18; B32B 15/20; B32B 21/04; B32B 2262/101; B32B 2457/02; B32B 2457/14; B32B 27/00; B32B 27/08; B32B 27/16; B32B 27/281; B32B 27/283; B32B 27/286; B32B 27/302; B32B 27/304; B32B 27/32; B32B 27/322; B32B 27/34; B32B 27/36; B32B 27/365; B32B 27/38; B32B 27/42; B32B 29/002; B32B 5/02; B32B 7/02; B32B 7/022; B32B 7/025; B32B 7/12; B32B 9/005; B29C 65/00; B29C 65/48; B29C 65/483; B29C 65/4855; B29C 65/486; B29C 65/76; B29C 66/41
USPC ........ 156/60, 247, 250, 272.2, 273.3, 273.9, 156/275.5, 275.7, 277, 278, 280, 289, 156/297, 299, 307.1, 307.3, 307.7, 329, 156/701, 714, 719; 528/10, 31; 428/447; 438/110, 113, 114, 118
See application file for complete search history.

(56) References Cited

U.S. PATENT DOCUMENTS

| | | | | |
|---|---|---|---|---|
| 5,976,955 A | * | 11/1999 | Hodges ............. | H01L 21/67346 156/247 |
| 6,235,862 B1 | | 5/2001 | Isshiki et al. | |

(Continued)

FOREIGN PATENT DOCUMENTS

| | | |
|---|---|---|
| JP | S59204259 A | 11/1984 |
| JP | S6148945 A | 3/1986 |

(Continued)

OTHER PUBLICATIONS

English translation of International Search Report for PCT/JP2017/038775 dated Jan. 30, 2018, 2 pages.

(Continued)

*Primary Examiner* — Philip C Tucker
*Assistant Examiner* — Brian R Slawski
(74) *Attorney, Agent, or Firm* — Warner Norcross + Judd LLP

(57) ABSTRACT

Provided is a laminate having a gel layer on a substrate able to protect the substrate during various types of processing used in industrial production steps prior to curing. The gel layer has excellent heat resistance, softness and flexibility, a low modulus of elasticity, low stress, excellent stress buffering properties, and electronic component retention properties. The gel layer has higher shape retention before curing but changing after curing into a hard layer having excellent release properties. The laminate is easily and readily releasable from the substrate even when the cured layer is localized. Applications thereof are also provided (such as an electronic component manufacturing method). The laminate comprises a laminated reaction-curable silicone gel and a sheet-like member laminated via an adhesive layer on top of the reaction-curable silicone gel.

10 Claims, No Drawings

(51) Int. Cl.
B32B 27/16 (2006.01)
B32B 27/28 (2006.01)

(56) References Cited

U.S. PATENT DOCUMENTS

| | | | |
|---|---|---|---|
| 9,448,506 B1 | 9/2016 | Awano | |
| 2004/0126931 A1* | 7/2004 | Hembree | H01L 23/3128 |
| | | | 438/122 |
| 2010/0148378 A1 | 6/2010 | Katayama et al. | |
| 2011/0306746 A1 | 12/2011 | Tanaka et al. | |
| 2012/0025247 A1 | 2/2012 | Ooyabu et al. | |
| 2013/0069106 A1 | 3/2013 | Mitani et al. | |
| 2014/0322522 A1 | 10/2014 | Yoo | |
| 2017/0121462 A1 | 5/2017 | Fujisawa et al. | |

FOREIGN PATENT DOCUMENTS

| | | | |
|---|---|---|---|
| JP | S62104145 A | 5/1987 | |
| JP | H1112546 A | 1/1999 | |
| JP | 2003213132 A | 7/2003 | |
| JP | 2007191629 A | 8/2007 | |
| JP | 2008045091 A | 2/2008 | |
| JP | 2008162240 A | 7/2008 | |
| JP | 2010012673 A | 1/2010 | |
| JP | 2010159411 A | 7/2010 | |
| JP | 2011153249 A | 8/2011 | |
| JP | 2012017458 A | 1/2012 | |
| JP | 2012028666 A | 2/2012 | |
| JP | 2013067054 A | 4/2013 | |
| JP | 2013129754 A | 7/2013 | |
| JP | 2014534296 A | 12/2014 | |
| JP | 2016124967 A | 7/2016 | |
| JP | 2016186543 A | 10/2016 | |
| JP | 2016186544 A | 10/2016 | |
| WO | 2015155950 A1 | 10/2015 | |

OTHER PUBLICATIONS

Machine assisted English translation of JP2008045091A obtained from https://patents.google.com on Apr. 24, 2019, 11 pages.
Machine assisted English translation of JP2008162240A obtained from https://patents.google.com on Apr. 24, 2019, 9 pages.
Machine assisted English translation of JP2010012673A obtained from https://patents.google.com on Apr. 24, 2019, 6 pages.
Machine assisted English translation of JP2013129754A obtained from https://patents.google.com on Apr. 24, 2019, 21 pages.
Machine assisted English translation of JPS59204259A obtained from https://worldwide.espacenet.com on Apr. 29, 2019, 5 pages.
Machine assisted English translation of JPS62104145A obtained from https://worldwide.espacenet.com on Apr. 29, 2019, 5 pages.
Machine assisted English translation of JP2003213132A obtained from https://patents.google.com on Apr. 29, 2019, 8 pages.
Machine assisted English translation of JP2011153249A obtained from https://patents.google.com on May 8, 2019, 13 pages.
Machine assisted English translation of JP2007191629A obtained from https://patents.google.com on May 8, 2019, 11 pages.
Machine assisted English translation of JP2016124967A obtained from https://patents.google.com on May 8, 2019, 21 pages.
Machine assisted English translation of JP2016186543A obtained from https://patents.google.com on May 8, 2019, 14 pages.
Machine assisted English translation of JPS6148945A obtained from https://worldwide.espacenet.com on May 9, 2019, 5 pages.

* cited by examiner

LAYERED BODY AND METHOD FOR MANUFACTURING ELECTRONIC COMPONENT

CROSS-REFERENCE TO RELATED APPLICATIONS

This application is the National Stage of International Application No. PCT/JP2017/038775 filed on 26 Oct. 2017, which claims priority to and all advantages of Japanese Patent Appl. No. 2016-212742 filed on 31 Oct. 2016, the content of which is hereby incorporated by reference.

TECHNICAL FIELD

The present invention provides a laminate comprising a reaction-curable silicone gel experiencing a change in physical properties from a soft gel layer having superior shape retention on an electronic component to a hard cured layer after a curing reaction and a sheet-like member laminated via an adhesive layer on the gel, and provides a manufacturing method for an electronic component using this laminate.

BACKGROUND ART

Silicone gel is commonly used to protect damping materials for optical applications, automotive electronic components, and consumer electronic components because a silicone gel with excellent heat resistance, weather resistance, oil resistance, cold resistance, and electrical insulation properties can be obtained by curing the organopolysiloxane having a reactive functional group at a low crosslinking density, and because, unlike ordinary elastomer products, silicone gel has a low modulus of elasticity, low stress, and excellent stress buffering properties while in gelatinous form (see, for example, Patent Documents 1-7). In particular, because silicone gel is soft, easily deformable, and able to conform to the uneven surface of a substrate, it follows the contours of an uneven substrate without leaving gaps or separation, unlike silicone elastomers and hard cured products.

However, silicone gel is gelatinous and thus weak against deformation and susceptible to destruction by external stresses such as vibrations and internal stresses from expansion and contraction due to temperature changes. When silicone gel is to be separated from an electronic component requiring protection, adhesion, and stress buffering from the gel or is cut (in, for example, a dicing operation), sticky deposits or disrupted but cohesive gel may remain on the electronic component, and this gel may not be easily removed from the base material or electronic component. These gel deposits may cause electronic components to become defective, for example, by impairing mounting on semiconductors, and may cause the final product to become defective. However, when the crosslinking density of organopolysiloxane is increased to facilitate complete curing of the gel, the advantageous properties of silicone gel, such as low elasticity, low stress, and excellent stress buffering properties, are lost, the gel layer conforms poorly to an uneven substrate, and gaps and separation from the substrate occurs. For these reasons, the problems with cured silicone gel materials and silicone elastomers of the prior art remain unresolved.

In the fields of adhesive films and semiconductor sealants, curable compositions have been proposed in which curing reactions occur in multiple stages under different curing reaction conditions. For example, in Patent Document 8, a two-step curing reaction is performed in which the curing in the first stage provides tackiness required in the dicing process, and the curing in the second stage provides strong adhesiveness. A thermosetting composition suitable for use in dicing/die bonding adhesive sheet has also been disclosed. In Patent Document 9, the present applicant proposed a curable silicone composition with excellent initial curability that maintains high physical strength even when exposed to high temperatures of 250° C. or higher.

However, in curable compositions of the prior art using a multi-step curing process, the formation of a silicone gel and the technical advantages of changing from a soft gel to a hard completely cured product have neither been described nor suggested.

The present applicant has proposed reaction-curable silicone gels capable of solving these problems, laminates using these silicone gels, and methods for manufacturing electronic components using these laminates (Patent Document 10, Patent Document 11). Laminates using these reaction-curable silicone gels are extremely useful for solving the problems described above.

PRIOR ART DOCUMENTS

Patent Documents

Patent Document 1: JP S59-204259 A
Patent Document 2: JP S61-048945 A
Patent Document 3: JP S62-104145 A
Patent Document 4: JP 2003-213132 A (JP 3,865,638 B2)
Patent Document 5: JP 2012-017458 A (JP 5,594,232 B2)
Patent Document 6: WO 2015/155950 A1 (JP 5,794,229 B2)
Patent Document 7: JP 2011-153249 A
Patent Document 8: JP 2007-191629 A (JP 4,628,270 B2)
Patent Document 9: JP 2016-124967 A
Patent Document 10: JP 2016-186543 (Undisclosed at Time of Filing)
Patent Document 11: JP 2016-186544 (Undisclosed at Time of Filing)

SUMMARY OF THE INVENTION

Problem to be Solved by the Invention

Unfortunately, the present inventors discovered a new problem associated with the manufacture of electronic components using the reaction-curable silicone gels in Patent Documents 10 and 11. These reaction-curable silicone gels can selectively protect an electronic component during various treatments, and fewer defects occur during the processing and dicing of electronic components. As a result, these gels are extremely useful in the manufacture of electronic components. Also, because these gels change into a hard layer with good shape retention and excellent release properties after curing, they are easily separated from a substrate such as an electronic component and do not leave behind adhesive residues. However, when silicone gel is laminated on an electronic component using pinpointing, the adhesion area for the gel is relatively small. Therefore, separation from the substrate can be difficult when certain manufacturing equipment is used, and the area surrounding the cured layer can become damaged unintentionally. Large-scale industrial production in particular requires a method in which the cured layer can be separated simply, quickly, and reliably.

It is an object of the present invention to provide a laminate having a gel layer able to protect a substrate such as an electronic component during various types of processing used in industrial production steps prior to curing, the gel layer having excellent heat resistance, softness and flexibility, a low modulus of elasticity, low stress, excellent stress buffering properties, and electronic component retention properties, and the gel layer having higher shape retention before curing but changing after curing into a hard layer having excellent release properties, the laminate being easily and readily releasable from the substrate even when the cured layer is localized. It is another purpose of the present invention to provide a method for manufacturing an electronic component which is less likely to cause defects in the electronic component and final product because, by using the laminate, problems such as adhesion of silicone gel or a cured product thereof to a substrate such as an electronic component can be prevented, and because the cured product can be separated from the substrate easily, quickly, and reliably.

Means for Solving the Problem

As a result of extensive research, the present inventors discovered that the aforementioned problems could be solved using a laminate comprising a reaction-curable silicone gel laminated on at least one type of substrate and a sheet-like member laminated via an adhesive layer on the reaction-curable silicone gel. The present invention is a product of this discovery.

The present inventors also discovered that the aforementioned problems could be solved using a method for manufacturing an electronic component (or precursor thereof) serving as the substrate comprising the steps of curing the reaction-curable silicone gel after processing the electronic component protected by the reaction-curable silicone gel in any way, and separating the sheet-like member and cured product of the reaction-curable silicone gel substantially simultaneously from the electronic component. The present invention is a product of this discovery. Here, the sheet-like member forms a substantially integrated conjoined product with the cured product of the reaction-curable silicone gel and the cured product conforming to the sheet-like member is substantially simultaneously separated from the electronic component when the sheet-like member is peeled off.

Effects of the Invention

The present invention is able to provide a laminate having a gel layer able to protect a substrate such as an electronic component during various types of processing used in industrial production steps prior to curing, the gel layer having excellent heat resistance, softness and flexibility, a low modulus of elasticity, low stress, excellent stress buffering properties, and electronic component retention properties, and the gel layer having higher shape retention before curing but changing after curing into a hard layer having excellent release properties, the laminate being easily and readily releasable from the substrate even when the cured layer is localized. The present invention is also able to provide a method for manufacturing an electronic component which is less likely to cause defects in the electronic component and final product because, by using the laminate, problems such as adhesion of silicone gel or a cured product thereof to a substrate such as an electronic component can be prevented, and because the cured product can be separated from the substrate easily, quickly, and reliably.

EMBODIMENT OF THE INVENTION

The laminate comprises a reaction-curable silicone gel laminated on at least one type of substrate and a sheet-like member laminated via an adhesive layer on the reaction-curable silicone gel. The following is a detailed description.

[Reaction-Curable Silicone Gel]

This laminate is characterized by the provision of a reaction-curable silicone gel. This silicone gel can protect a substrate such as an electronic component during various types of processing in a non-fluid gelatinous state and is changed to a hard layer during a curing reaction occurring in response to exposure to heat or high-energy radiation which has higher shape retention than before the curing reaction and excellent release properties. There are no particular restrictions on the shape of the silicone gel layer as long as it forms a layer. However, when used in the manufacture of electronic components as described below, substantially flat silicone gel is preferred. There are no particular restrictions on the thickness of the silicone layer, but the average thickness is from 10 to 500 μm, from 25 to 300 μm, or from 30 to 200 μm. If the average thickness is less than 10 μm, it is difficult to fill the spaces (gaps) caused by the unevenness of a substrate such as an electronic component. If the average thickness is greater than 500 μm, the amount of silicone gel may be uneconomical if the layer is used in the manufacture of an electronic component to hold the electronic component in place during processing. There are no particular restrictions on the appearance of a reaction-curable silicone gel. However, it is preferably transparent or semi-transparent during the processing and dicing (separation) of individual electronic components. The silicone gel described below forms a substantially transparent or semi-transparent gel once cured unless a coloring material is added.

The silicone gel is an organopolysiloxane crosslinked product with relatively low crosslinking density. From the standpoint of the flexibility, low elastic modulus, low stress, and stress buffering properties required of the gel, the loss tangent tan δ of the silicone gel layer (measured at a frequency of 0.1 Hz using a viscoelasticity measuring device) is preferably in the range from 0.005 to 1.00 or from 0.01 to 1.00 at 23° C. to 100° C., and is preferably in a range from 0.01 to 0.95, 0.03 to 0.95, or 0.10 to 0.90 at 23° C. When the temperature 50° C. or less, preferably 80° C. or less, and more preferably 100° C. or less, the curing reaction of the silicone gel layer of the present invention is less likely to progress rapidly. In this temperature range, the loss tangent tan δ of the silicone gel layer falls within the aforementioned range. The loss tangent tan δ of the silicone gel layer can be easily measured by isolating the silicone gel layer (sheet) using a means such as separating the silicone gel layer from the substrate or subjecting the curable organopolysiloxane composition raw material on a peelable substrate to primary curing.

The silicone gel is reaction-curable and changes from the properties and characteristics of a gel to a hard layer having higher shape retention and excellent release properties. More specifically, the storage modulus $G'_{cured}$ of the cured product of the reaction-curable silicone gel obtained from the curing reaction increases by at least 25% compared to the storage modulus $G'_{gel}$ of silicone gel prior to curing, preferably at least 50%, and more preferably at least 100%, at least 150%, at least 200%, or at least 300%. A higher $G'_{cured}/G'_{gel}$ value means soft gel has changed to a harder cured product with higher shape retention. When the silicone gel exhibits relatively hard physical properties prior to curing, the difference between the storage modulus before and after curing may be relatively small.

There are no particular restrictions on the curing reaction mechanism for the silicone gel. Examples include hydrosilylation curing using an alkenyl group and silicon atom-bonded hydrogen atom; dehydration condensation reaction curing using silicon atom-bonded alkoxy groups such as silanol groups and/or alkoxysilyl groups; dealcoholizing condensation reaction curing; peroxide reaction curing by using an organic peroxide; or radical reaction curing using exposure of a mercapto group to high energy radiation. Because curing is relatively quick and the reaction can be easily controlled, preferred examples include hydrosilylation reaction curing, peroxide reaction curing, radical reaction curing, and combinations thereof. These curing reactions are promoted using heating, high energy radiation, or a combination of these.

When the silicone gel is cured using heat, the method includes at least the step of curing the silicone gel using heat at a temperature above 100° C., preferably above 120° C., more preferably 150° C. or higher, and still more preferably 170° C. or higher. Heat at a temperature of 150° C. or higher is preferred when the curing reaction mechanism for the silicone gel is a peroxide reaction curing mechanism or a curing reaction mechanism including an encapsulated hydrosilylation reaction catalyst. From a practical standpoint, a temperature in a range from 120° C. to 200° C. or from 150° C. to 180° C. is preferably selected. Although the silicone gel can be cured at a relatively low temperature from 50° C. to 100° C., the silicone gel layer in a laminate of the present invention preferably remains a gel at low temperatures. In particular, a silicone gel that does not substantially undergo a curing reaction and remains a gel at 50° C. or less is preferred.

Examples of high energy radiation (or active energy radiation) include ultraviolet light, electron beams, and electromagnetic radiation. However, ultraviolet light is preferred from a practical standpoint. The UV light source can be a high-pressure mercury lamp, a medium-pressure mercury lamp, a Xe—Hg lamp, or a deep UV lamp. Ultraviolet light with a wavelength from 280 to 400 nm is preferred. A wavelength of 350 to 400 nm is especially preferred. The amount of radiation at this time is preferably from 100 to 10,000 $mJ/cm^2$. When the silicone gel is cured using high energy radiation, a selective curing reaction is possible regardless of the aforementioned temperature conditions.

Practically speaking, the following are the curing operations, curing reaction mechanisms, and curing reaction conditions for a reaction-curable silicone gel of the present invention. The heating time and the amount of ultraviolet light depend on the thickness of the silicone gel and the target physical properties after curing.
(i) Heating operation for the silicone gel at 120 to 200° C.: Hydrosilylation curing, peroxide curing, or a combination of these
(ii) UV exposure operation for the silicone gel: radical reaction curing by high energy radiation, hydrosilylation reaction curing using a photoactive platinum complex curing catalyst, or a combination of these
(iii) Combinations of the curing operations, curing mechanisms, and conditions in (i) and (ii) above, especially a combination of simultaneous or staggered curing operations.

The reaction-curable silicone gel is obtained (in the primary curing reaction) as a gel-like cured product of a curable silicone composition. Here, unreacted reaction-curable functional groups or unreacted organic peroxides are present in the crosslinked silicone material constituting the silicone gel layer. The curing reaction continues (in the secondary curing reaction) to form a hard cured product with a higher crosslinking density. When a curable silicone composition is used as the starting material, the reaction-curable reactive silicone gel that is a constituent element of the present invention is obtained from the primary curing reaction, and this silicone gel changes into a hard cured product during the secondary curing reaction. In a curing reaction including a peroxide curing reaction, a silicone gel can be cured which has functional groups that are not reaction-curable in other curing reaction mechanisms, such as alkyl groups.

There are no particular restrictions on the primary curing reaction mechanism used to form a silicone gel from a curable silicone composition. Examples include hydrosilylation reaction curing using an alkenyl group and silicon atom-bonded hydrogen atom; dehydration condensation reaction or dealcoholizing condensation reaction curing using silicon atom-bonded alkoxy groups such as silanol groups and/or alkoxysilyl groups; a peroxide curing reaction using an organic peroxide; radical reaction curing using exposure of a mercapto group to high energy radiation; and hydrosilylation reaction curing using a photoactive platinum complex curing catalyst. The secondary curing reaction mechanism for the silicone gel may be the same as or different from the primary curing reaction mechanism used to form the silicone gel. For example, after forming a silicone gel layer on a substrate using a dehydration condensation reaction, dealcoholizing condensation reaction, or high energy radiation without a heating operation, the silicone gel layer can be heated at a high temperature to cure the silicone gel layer. When the same curing mechanism is used as the primary curing reaction for obtaining the silicone gel from the curable silicone composition and as the secondary curing reaction for further curing of the silicone gel, the unreacted curable reactive groups and curing agent must remain in the silicone gel obtained after the curable silicone composition has been subjected to primary curing, except in the case of a peroxide curing reaction.

Because the silicone gel is reaction-curable, use of one or more type of curing agent selected from among hydrosilylation reaction catalysts, organic peroxides, and photopolymerization initiators is preferred. The curing agent may be encapsulated, and use of a capsulated curing agent, especially a hydrosilylation reaction catalyst, is preferred from the standpoint of the storage stability of the silicone gel layer and controlling the curing reaction of the silicone gel layer. A hydrosilylation reaction catalyst such as a photoactive platinum complex can also be used to promote a hydrosilylation reaction using high energy radiation such as ultraviolet light.

The amount of curing agent used may be established so that some of the curing agent remains in the reaction-curable silicone gel when a silicone gel has been formed by subjecting a curable silicone composition to primary curing. Alternatively, conditions for the curing reactions can be selected so that the primary curing reaction and the secondary curing reaction after the silicone gel has been formed are different, and by adding a curing agent for each reaction so that some remains in an unreacted state in the silicone gel.

Examples of hydrosilylation reaction catalysts include platinum-based catalysts, rhodium-based catalysts, and palladium-based catalysts. Platinum-based catalysts are preferred because they are able to significantly accelerate the curing of the composition. Examples of platinum-based catalysts include fine platinum powder, chloroplatinic acid, alcohol solutions of chloroplatinic acid, platinum-alkenyl siloxane complexes, platinum-olefin complexes, and platinum-carbonyl complexes. These platinum-based catalysts can be dispersed or encapsulated in a silicone resin, polycarbonate resin, acrylic resin or another thermoplastic resin. Platinum-alkenyl siloxane complexes are especially preferred. Examples of alkenyl siloxanes include 1,3-divinyl-1,1,3,3-tetramethyldisiloxane, 1,3,5,7-tetramethyl-1,3,5,7-tetravinylcyclotetrasiloxane, alkenyl siloxanes in which some of the methyl groups in the alkenyl siloxane have been substituted with ethyl groups and phenyl groups, and alkenyl siloxanes in which some of the vinyl groups in the alkenyl siloxane have been substituted with allyl group or hexenyl groups. Because the stability of platinum-alkenyl siloxane complexes is especially good, 1,3-divinyl-1,1,3,3-tetramethyldisiloxane is preferred. A non-platinum-based metal catalyst such as iron, ruthenium, or iron/cobalt may be used as a catalyst for promoting a hydrosilylation reaction.

A platinum-containing hydrosilylation reaction catalyst in which particulates are dispersed or encapsulated in a thermoplastic resin may also be used in a reaction-curable silicone gel of the present invention. Use of an encapsulated curing agent improves workability, the pot life of the composition, the storage stability of the reaction-curable silicone gel, and temperature control of the curing reaction. Specifically, by selecting temperature conditions under which the thermoplastic resin or wax used to form the capsules (specifically, the walls of the capsules encapsulating the curing agent) does not melt during formation the silicone gel in the primary curing reaction, the encapsulated curing agent remains in the silicone gel in an unreacted and inactive state. In this way, storage stability of the silicone gel layer containing the curing agent can improved. Also, by selecting high-temperature conditions in which the melting temperature of the thermoplastic resin forming the capsules is exceeded during the curing reaction for the silicone gel (secondary curing reaction), the reaction activity of the curing agent in the capsules can be selectively deployed only under high temperature conditions. This makes control of the curing reaction for the silicone gel easy. The thermoplastic resin or wax used to form the capsules (specifically, the walls of the capsules encapsulating the curing agent) can be selected based on the temperature conditions used to form the silicone gel and the temperature conditions used to cure the uncured silicone gel. Here, the curing agent is not limited to platinum-containing hydrosilylation reaction catalysts.

In the present invention, a hydrosilylation reaction catalyst, such as a photoactive platinum complex curing catalyst, that promotes a hydrosilylation reaction when exposed to high energy radiation such as ultraviolet light instead of heat may be used. Preferred examples of these hydrosilylation reaction catalysts include β-diketone platinum complexes and platinum complexes having a cyclic diene compound as a ligand. Specific examples of platinum complexes include trimethyl (acetylacetonato) platinum complex, trimethyl (2,4-pentanedionate) platinum complex, trimethyl (3,5-heptanedionate) platinum complex, trimethyl (methylacetoacetate) platinum complex, bis (2,4-pentanedionato) platinum complex, bis (2,4-hexanedionato) platinum complex, bis (2,4-heptanedionate) platinum complex, bis (3,5-heptanedionato) platinum complex, bis (1-phenyl-1,3-butanedionato) platinum complex, bis (1,3-diphenyl-1,3-propanedionato) platinum complex, (1,5-cyclooctadienyl) dimethyl platinum complex, (1,5-cyclooctadienyl) diphenyl platinum complex, (1,5-cyclooctadienyl) dipropyl platinum complex, (2,5-norboradiene) dimethyl platinum complex, (2,5-norboradiene) diphenyl platinum complex, (cyclopentadienyl) dimethyl platinum complex, (methylcyclopentadienyl) diethyl platinum complex, (trimethylsilylcyclopentadienyl) diphenyl platinum complex, (methylcycloocta-1,5-dienyl) diethylplatinum complex, (cyclopentadienyl) trimethylplatinum complex, (cyclopentadienyl) ethyldimethyl platinum complex, (cyclopentadienyl) acetyldimethyl platinum complex, (methyl cyclopentadienyl) trimethyl platinum complex, (methylcyclopentadienyl) trihexyl platinum complex, (trimethylsilyl cyclopentadienyl) trimethyl platinum complex, (trimethylsilyl cyclopentadienyl) trihexyl platinum complex, (dimethylphenylsilylcyclopentadienyl) triphenyl platinum complex, and (cyclopentadienyl) dimethyltrimethylsilylmethyl platinum complex.

When a curing agent that accelerates the hydrosilylation reaction using high energy radiation is used, the silicone gel can be formed in the primary curing reaction or the silicone gel can be cured in by the secondary curing without applying heat using a curable silicone composition as the raw material.

The amount of hydrosilylation reaction catalyst used per 100 parts by mass silicone gel is preferably from 0.01 to 500 ppm, from 0.01 to 100 ppm, or from 0.01 to 50 ppm in terms of mass units of metal atoms.

Examples of organic peroxides include alkyl peroxides, diacyl peroxides, peroxide esters, and peroxide carbonates. When curing of the reaction-curable silicone gel layer is performed selectively at high temperatures in particular, the ten-hour half-life temperature of the organic peroxide is preferably 70° C. or higher and may be 90° C. or higher. When high energy radiation is selected for the primary curing reaction used to form the silicone gel, selection of an organic peroxide that is not inactivated by the primary curing is preferred.

Examples of alkyl peroxides include dicumyl peroxide, di-tert-butyl peroxide, di-tert-butylcumyl peroxide, 2,5-dimethyl-2,5-di (tert-butylperoxy) hexane, 2,5-dimethyl-2,5-di (tert-butylperoxy) hexyne-3, tert-butylcumyl, 1,3-bis (tert-butylperoxyisopropyl) benzene, and 3,6,9-triethyl-3,6,9-trimethyl-1,4,7-triperoxonane.

Examples of diacyl peroxides include benzoyl peroxide such as p-methylbenzonyl peroxide, lauroyl peroxide, and decanoyl peroxide.

Examples of peroxide esters include 1,1,3,3-tetramethylbutyl peroxy neodecanoate, α-cumyl peroxy neodecanoate, tert-butyl peroxy neodecanoate, tert-butyl peroxy neoheptanoate, tert-butyl peroxy pivalate, tert-hexyl peroxypivalate, 1,1,3,3-tetramethylbutylperoxy-2-ethylhexanoate, tert-amyl peroxyl-2-ethylhexanoate, tert-butylperoxy-2-ethylhexanoate, tert-butyl peroxyisobutyrate, di-tert-butylperoxyhexahydroterephthalate, tert-amyl peroxy-3,5,5-trimethylhexanoate, tert-butylperoxy-3,5,5-trimethylhexanoate, tert-butyl peroxy acetate, tert-butyl peroxybenzoate, and di-butylperoxytrimethyl adipate.

Examples of peroxide carbonates include di-3-methoxybutyl peroxydicarbonate, di (2-ethylhexyl) peroxydicarbonate, diisopropyl peroxy carbonate, tert-butyl peroxyisopropyl carbonate, di (4-tert-butylcyclohexyl) peroxydicarbonate, dicetyl peroxy dicarbonate, and dimyristyl peroxy dicarbonate.

The ten-hour half-life temperature of these organic peroxides is preferably 70° C. or higher and may be 90° C. or higher or 95° C. or higher. Examples of these organic peroxides include p-methylbenzonyl peroxide, dicumyl peroxide, di-t-butyl peroxide, di-t-hexyl peroxide, t-butylcumyl peroxide, 2,5-dimethyl-2,5-di (tert-butylperoxy) hexane, 1,3-bis (tert-butylperoxyisopropyl) benzene, di-(2-t-butylperoxyisopropyl) benzene, and 3,6,9-triethyl-3,6,9-trimethyl-1,4,7-triperoxonane.

There are no particular restrictions on the amount of organic peroxide used. However, the amount per 100 parts by mass silicone gel is preferably from 0.05 to 10 parts by mass or from 0.10 to 5.0 parts by mass.

A photopolymerization initiator generates radicals when exposed to high energy radiation such as ultraviolet light or electron beams. Specific examples include acetophenones and derivatives thereof such as acetophenone, dichloroacetophenone, trichloroacetophenone, tert-butyl trichloroacetophenone, 2,2-diethoxyacetophenone, and p-dimethylamino acetophenone; benzoins and derivatives thereof such as benzoin, benzoin methyl ether, benzoin ethyl ether, benzoin butyl ether, and benzoin n-butyl ether; benzophenones and derivatives thereof such as benzophenone, 2-chlorobenzophenone, p, p'-dichlorobenzophenone, and p, p'-bisdiethylaminobenzophenone; as well as p-dimethylaminopropiophenone, Michler's ketone, benzyls, benzyl dimethyl ketal, tetramethylthiuram monosulfide, thioxanthone, 2-chlorothioxanthone, 2-methylthioxanthone, azoisobutyronitrile, benzoin peroxide, di-tert-butyl peroxide, 1-hydroxycyclohexyl phenyl ketone, 2-hydroxy-2-methyl-1-phenyl-propan-1-one, 1-(4-isopropylphenyl)-2-hydroxy-2-methylpropan-1-one, methyl benzoyl formate, diphenyl sulfide, anthracene, 1-chloroanthraquinone, diphenyl disulfide, diacetyls, hexachlorobutadiene, pentachlorobutadiene, octachlorobutadiene, and 1-chloromethyl naphthalene. Acetophenones, benzoins, benzophenones, and derivatives thereof are preferred.

There are no particular restrictions on the amount of photopolymerization initiator that is used. However, the amount per 100 parts by mass silicone gel is preferably from 0.1 to 10 parts by mass.

When the silicone gel contains a photopolymerization initiator as the curing agent, the silicone gel may also include another component such as a photosensitizer. Examples include n-butylamine, di-n-butylamine, tri-n-butyl phosphine, allylthioureas, s-benzylisothiuronium-p-toluenesulfinate, triethylamine, and diethylaminoethyl methacrylate.

There are no particular restrictions on the silicone gel used in the present invention as long as it has the reactive curability as described above and does not impose restrictions on the composition and primary curing conditions of the curable silicone composition serving as the raw material. It preferably has good storage stability and remains in a gelatinous state from room temperature to 100° C. after the silicone gel layer has been formed, selectively promotes the secondary curing reaction when exposed to high energy radiation or heat at a temperature of 100° C. or higher, preferably 120° C. or higher, and more preferably 150° C. or higher, and is easily controlled. Therefore, when designed to selectively promote the curing reaction of the silicone gel layer at high temperatures, the curable silicone composition raw material is preferably cured in a gelatinous state at a relatively low temperature from room temperature to 100° C. In particular, when a curing mechanism including a hydrosilylation curing reaction or a curing reaction using an organic peroxide is selected as the secondary curing reaction after formation of the silicone gel, the curing reactions do not proceed sufficiently at temperatures below 100° C. Therefore, reaction-curable functional groups or curing agent remains unreacted in the silicone gelatinous formed by the primary curing reaction in the aforementioned temperature range, and a reaction-curable silicone gel layer that is selectively curable at high temperatures can be easily obtained.

In particular, when a hydrosilylation reaction is selected as the primary cure reaction, this reaction-curable silicone gel layer is obtained preferably by curing a curable silicone composition containing at least a resinous or branched organopolysiloxane in gelatinous form and more preferably by curing a curable silicone composition containing a resinous organopolysiloxane having at least two alkenyl groups in the molecule in gelatinous form. The reaction-curable resinous or branched organopolysiloxane is an organopolysiloxane containing a tetrafunctional siloxy unit represented by $SiO_{4/2}$ or trifunctional siloxy unit represented by $RSiO_{3/2}$ (where R is a monovalent organic group or hydroxyl group), and has a reaction-curable functional group able to form a silicone gel in the primary curing reaction.

[Substrate]

The substrate on which the silicone gel layer is laminated may be uneven, and the silicone gel layer preferably fills in the unevenness and conforms to the unevenness without leaving gaps to form a flat silicone gel layer. Because a reaction-curable silicone gel layer of the present invention is flexible, elastically deformable and shape conforming, it does not leave gaps on an uneven substrate and does not experience problems such as deforming the silicone gel surface. There are no particular restrictions on the purpose for laminating a silicone gel layer on a substrate. When the substrate is an electronic component, the portions of the electronic component on which a silicone gel layer is selectively laminated can be protected during various types of processing or the electric component may be protected from physical impacts and vibrations by a soft silicone gel layer.

There are no particular restrictions on the substrate used in the present invention. Any substrate may be selected, but an electronic component or a precursor thereof is preferred. Examples of substrates and adherends include glass, ceramics, mortar, concrete, wood, aluminum, copper, brass, zinc, silver, stainless steel, iron, tin, tinplate, nickel-plating, epoxy resins, and phenolic resins. Other examples of substrates and adherends include thermoplastic resins such as polycarbonate resins, polyester resins, ABS resins, nylon resins, polyvinyl chloride resins, polyphenylene sulfide resins, polyphenylene ether resins, and polybutylene terephthalate resins. The substrate may be a rigid plate or a flexible sheet. It may also be a stretchable film or sheet substrate used, for example, as the substrate for dicing tape.

The substrate used in the present invention may be subjected to surface treatment such as primer treatment, corona treatment, etching treatment, or plasma treatment to improve adhesion to the reaction-curable silicone gel layer. As a result, even when the reaction-curable silicone gel layer has been cured to form a cured product layer with excellent shape retention and release properties and low tackiness, adhesion between the cured product layer and the substrate remains sufficiently high, and the electronic component is easily separated from the cured layer.

When using a laminate of the present invention in the manufacture of an electronic component, the substrate is preferably an electronic component or precursor thereof. Specific examples include a semiconductor element, a pedestal for at least temporarily arranging an electronic component during the manufacturing process, a semiconductor wafer for lamination applications, a ceramic element (such as a ceramic capacitor), and a substrate for electronic circuitry applications. This may be diced to separate individual components afterwards. Preferred examples include a semiconductor element, a pedestal for arranging electronic components, a circuit board, a semiconductor substrate, or a semiconductor wafer.

There are no particular restrictions on the material used in the substrate. Materials used in circuit boards include organic resins such as glass epoxy resins, Bakelite resins and phenol resins, ceramics such as alumina, metals such as copper and aluminum, and a silicon wafer for semiconductor applications. When the substrate is used as an electronic component such as a semiconductor element or circuit board, conductive wiring made of a material such as silver palladium may be printed on the surface. A reaction-curable silicone gel of the present invention can conform to the uneven surface of a semiconductor element and printed circuit board without leaving gaps to form a flat silicone gel surface. The surface on which the silicone gel has been formed can be protected against physical impacts and various types of processing.

[Electronic Components]

As mentioned above, a laminate of the present invention preferably has one or more electronic components as the substrate. There are no particular restrictions on the type of electronic component. Examples include a semiconductor wafer serving as an element in a semiconductor chip, a ceramic element (such as a ceramic capacitor), a semiconductor chip, and a light-emitting semiconductor chip. A reaction-curable silicone gel layer may be disposed on top of two or more electronic components that are the same or different. Because a reaction-curable silicone gel layer in a laminate of the present invention is gelatinous and has selective curing conditions, a curing reaction hardly occurs at all even when handled in a fairly high temperature range. Because the silicone gel layer is soft, deformable, and shape conformable, a flat surface can be stably formed. Because the silicone gel selectively protects the laminated surface from various treatments or absorbs vibrations and impacts during manufacture of the electronic component, the electronic component on which the silicone gel has been laminated remains stable at a fixed location, and electronic component processing defects do not occur due to substrate surface unevenness, misaligned electronic components, or vibration displacement (damping) even when the electronic component has been subjected to processing such as patterning and dicing. The electronic components are held in place by the elasticity of the gel, the weak adhesive force of the gel itself, and the conformability of the gel.

[Processing of Electronic Components]

These electronic components may be subjected to chemical or physical treatment before the laminate is formed, and may be subjected to these treatments after the silicone gel has been laminated on the electronic components. Because electronic components can be protected selectively from these treatments where the silicone gel has been laminated, electronic components only in certain locations can be subjected to the desired chemical or physical treatment. The present invention is particularly useful in the selective protection of electronic components because the cured product of the silicone gel can be effectively separated even when localized or pinpointed. The processing performed on these electronic components includes, but is not limited to, formation of electronic circuits or electrode patterns, conductive film, and insulating film at least partially. There are no particular restrictions on these treatments. Any means common in the art can be used. Examples include vacuum deposition, sputtering, electroplating, chemical plating (including electroless plating), etching, printing, and lift-off methods. When the laminate of the present invention is used in the manufacture of an electronic component, electronic circuits, electrode patterns, conductive film, and insulating film can be formed for the electronic component after the reaction-curable silicone gel has been formed or, optionally, after the laminate has been divided into individual units (dicing). As mentioned above, electronic component processing defects are suppressed by using a silicone gel layer. For the processing, the longitudinal and transverse relationship between the electronic component serving as the substrate and the silicone gel layer can be established as desired.

Because the silicone gel forms a cured layer with excellent shape retention, hardness, and surface release properties when cured, the cured layer can be easily separated from the electronic component in a laminate using an electronic component as the substrate. Foreign substances such as residues (adhesive residues) derived from the silicone gel are less likely to adhere to electronic components, and defective products are less likely to occur. Formation of conjoined product with a sheet-like substrate described below allows the cured product to be rapidly, simply and reliably separated from the electronic component.

[Sheet-Like Member]

The sheet-like member at least partially comprises an adhesive layer and is laminated on the reaction-curable silicone gel via the adhesive layer. Because the sheet-like member adheres to the silicone gel via the adhesive layer, when the reaction-curable silicone gel forms a cured product, the sheet-like member and the cured product form a conjoined product that can be separated from the substrate substantially as a single unit. The cured product obtained by curing the reaction-curable silicone gel may experience problems such as breakage and complications during the peeling process depending on the type of mechanical device used in the separation process. However, a silicone gel cured product integrated with a sheet-like member can be easily separated even when localized or pinpointed. The conjoined product can be simply, quickly, and reliably separated from the substrate, and operating times and the number of steps can be significantly reduced in the industrial production process.

There are no particular restrictions on the adhesive film or adhesive sheet used as the sheet-like member with an adhesive layer. There are no particular restrictions on the substrate used in the sheet-like member as long as it is substantially flat and has a width and thickness appropriate for tape or film. Specific examples of sheet-like materials include paper, synthetic resin film, cloth, synthetic fibers, metal foil (such as aluminum or copper foil), glass fibers, and composite materials obtained by laminating any of these sheet-like materials. Synthetic resin film is especially preferred. Examples include polyester, polytetrafluoroethylene, polyimide, polyphenylene sulfide, polyamide, polycarbonate, polystyrene, polypropylene, polyethylene, PVC, polyvinylidene chloride, polycarbonate, polyethylene terephthalate, and nylon. There are no particular restrictions on the thickness, which is usually from 5 to 300 μm.

The synthetic resin film may be subjected to a surface treatment such as primer treatment, corona treatment, etching treatment, or plasma treatment. This improves the adhesion and integration of the adhesive layer with the sheet-like member described below.

There are no particular restrictions on the type of adhesive layer used on the sheet-like member. However, because the object is to form a conjoined product with the cured product of the reaction-curable silicone gel so as to be integrally separable, the adhesive layer preferably forms a strong bond in which the failure mode is cohesive failure when an attempt is made to separate it from the target. The adhesive substance is preferably stronger than a sticky substance causing interfacial peeling at the so-called adhesion surface.

The adhesive substance (adhesive agent) can be an adhesive polymer such as an isocyanate, polyvinyl alcohol, gelatin, vinyl latex, aqueous polyester, natural rubber, synthetic rubber, acrylic resin, silicone, urethane, vinyl alkyl ether, polyvinyl alcohol, polyvinyl pyrrolidone, polyacrylamide, or cellulose. Under specific bonding conditions, these adhesive agents firmly adhere to the cured product of the reaction-curable silicone gel to form a conjoined product between the sheet-like substrate and the cured product.

In the present invention, use of a silicone-based adhesive layer is especially preferred from the standpoint of forming a conjoined product with the cured product of the reaction-curable silicone gel. The silicone-based adhesive layer can be cured using a curing mechanism that is the same as or different from that of the reaction-curable silicone gel. For example, the sheet-like member can be laminated on a peroxide reaction-curable silicone gel via a peroxide reaction-curable silicone-based adhesive layer. The peroxide curing reaction can be performed by heating both components as an integrated unit to firmly bond the cured product of the silicone gel with the adhesive layer and obtain a curing reaction in which the sheet-like member and cured product of the silicone gel are integrated. The proper reaction mechanism for both components can be selected based on the processing to be performed on the desired laminate or substrate.

Preferred examples include hydrosilylation reaction-curable silicone-based adhesives, peroxide reaction-curable silicone-based adhesives, and high energy radiation-curable silicone-based adhesives. The silicone-based adhesive may also be cured by two or more of these curing mechanisms.

[Laminate Manufacturing Method]

The laminate of the present invention is obtained by laminating a sheet-like member on a substrate via silicone gel and an adhesive layer. If desired, the laminate can be manufactured by applying the curable silicone composition serving as the raw material composition of the silicone gel to the target substrate and curing the silicone composition to obtain a gel. Similarly, the laminate can also be manufactured by forming the silicone gel on a sheet-like substrate with the desired release layer, separating the silicone gel layer from the release layer and transferring it to another substrate, and laminating the sheet-like member on the silicone gel layer via an adhesive layer. The silicone gel can be laminated on the entire surface of the substrate, laminated locally, or laminated to protect the substrate in a pinpoint manner.

Specifically, a laminate of the present invention can be obtained using a manufacturing method comprising: applying a curable silicone composition that can form a silicone gel layer in the primary curing reaction on at least one type of substrate (Step A-1); subjecting the curable silicone composition on the substrate to primary curing to a gelatinous form to obtain a reaction-curable silicone gel layer (Step A-2); and laminating a sheet-like member on the reaction-curable silicone gel layer via an adhesive layer (Step A-3).

Similarly, a laminate of the present invention can be obtained using a manufacturing method comprising: applying a curable silicone composition that can form a silicone gel layer in the primary curing reaction on the release layer of a sheet-like substrate (substrate R) having a release layer (Step B-1); subjecting the curable silicone composition on the release layer to primary curing to gelatinous form to obtain a reaction-curable silicone gel layer (Step B-2); placing the silicone gel layer of the resulting laminate on at least one type of substrate different from substrate R and removing only substrate R (Step B-3); and laminating a sheet-like member on the reaction-curable silicone gel layer via an adhesive layer (Step B-4). Here, in order to improve the adhesion and adhesiveness of the silicone gel layer of the laminate on the surface facing at least one type of substrate different from the substrate R, the surface of the silicone gel facing the substrate is preferably subjected to a surface treatment such as primer treatment, corona treatment, etching treatment, and plasma treatment. By improving adhesion, substrate R can be easily separated.

When a reaction-curable silicone gel layer is formed on a sheet-like substrate (substrate R) with a release layer and then separated from the release layer to be handled as the sheet-like member, a silicone gel layer with a uniform surface can be formed using the following method.

[Manufacturing Method Using Curing Between Separators Having a Release Layer]

Preferably, the reaction-curable silicone gel layer is substantially flat. However, when the curable silicone composition raw material is applied to a substrate with a release layer in the usual manner and the thickness of the cured silicone gel layer is greater than 50 µm, the applied surface may be uneven and so the resulting surface of the silicone gel layer may be uneven. However, a flat reaction-curable silicone gel layer can be obtained by using a substrate with a release layer for the curable silicone composition and the silicone gel layer, and placing a sheet-like substrate with a release layer (substrate R; separator) on both sides of the uncured applied surface to physically form a flattened layer. In order to form a flattened layer, a laminate in which an uncured curable silicone composition has been applied is preferably rolled between separators with a release layer using any well-known method.

[Curable Silicone Composition]

The reaction-curable silicone gel layer constituting a laminate of the present invention is obtained by subjecting a curable silicone composition to a primarily curing to create a gel. The primary curing reaction used to form the silicone gel layer may be a curing reaction mechanism that is the same as or different from the secondary curing reaction for the silicone gel. However, from the standpoint of the stability of the silicone gel layer at 100° C. or lower, the curable silicone composition is preferably cured to form a gel in a temperature range from room temperature to 100° C.

The curable silicone composition preferably contains an organopolysiloxane having at least two curing reactive groups in the molecule (A), a curing agent (C) and, optionally, an organohydrogenpolysiloxane (B). In particular, when the primary curing reaction or the secondary curing reaction has a hydrosilylation reaction curing mechanism, the curable silicone composition preferably contains an organohydrogenpolysiloxane (B), a curing agent (C), and component (A) that is a mixture of a linear organopolysiloxane having at least two curing reactive groups in the molecule (A-1) and a resinous or branched organopolysiloxane having at least two curing reactive groups in the molecule (A-2). There are no particular restrictions on the reaction-curable functional group, but examples include a photopolymerizable functional group such as an alkenyl group or mercapto group.

Depending on the primary reaction curing mechanism, any of the following curing reaction may be used to form a reaction-curable silicone gel from these curable silicone compositions: hydrosilylation curing using an alkenyl group and silicon atom-bonded hydrogen atom; dehydration condensation reaction curing using silicon atom-bonded alkoxy groups such as silanol groups and/or alkoxysilyl groups; dealcoholizing condensation reaction curing; peroxide reaction curing by using an organic peroxide; or a hydrosilylation curing with high energy radiation using a photoactive platinum complex curing catalyst. When a peroxide curing reaction is selected, the composition can be cured to form a gel which has functional groups that are not reaction-curable in other curing reaction mechanisms, such as alkyl groups.

When the primary curing reaction is a hydrosilylation curing reaction, the reaction-curable groups include at least an alkenyl group, in particular, an alkenyl group having from 2 to 10 carbon atoms. Alkenyl groups having from 2 to 10 carbon atoms include a vinyl group, allyl groups, butenyl group, and hexenyl group. The alkenyl group having from 2 to 10 carbon atoms is preferably a vinyl group.

Similarly, when the primary curing reaction is a hydrosilylation curing reaction, the curable silicone composition preferably contains an organohydrogenpolysiloxane having two or more Si—H bonds in the molecule as a crosslinking agent. Here, the alkenyl group in the organopolysiloxane can be hydrosilylated with the silicon atom-bonded hydrogen atoms in the organohydrogenpolysiloxane to form a reaction-curable silicone gel layer. A hydrosilylation reaction catalyst described above also has to be used.

As mentioned above, the primary curing reaction in the present invention is preferably performed at a temperature of 100° C. or lower, and preferably at a temperature of 80° C. or lower. When the primary curing reaction is a hydrosilylation curing reaction, a gelatinous cured product with a low crosslinking density may be formed by exposure to high energy radiation using a photoactive platinum complex curing catalyst so that the curing reaction does not progress sufficiently at lower temperatures and a gelatinous cured product with a low crosslinking density is formed.

In dehydration condensation reaction curing or dealcoholizing condensation reaction curing, the curing reactive group is a silanol group (Si—OH) or silicon atom-bonded alkoxy group, and the alkoxy group is preferably an alkoxy group having from 1 to 10 carbon atoms such as a methoxy group, ethoxy group, or propoxy group. Preferably, the alkoxy group is bonded to a side chain or the end of the organopolysiloxane, or takes the form of an alkylalkoxysilyl group or alkoxysilyl group-containing group bonded to a silicon atom via another functional group. The organopolysiloxane having the reaction-curable group may also have a reaction-curable group for another curing mechanism in the same molecule, in addition to the dehydrating condensation reaction-curable or dealcoholizing condensation reaction-curable functional group. For example, in addition to a silicon atom-bonded alkoxy group or silanol group, the organopolysiloxane may have a hydrosilylizable functional group or a photopolymerizable functional group may be contained in the same molecule. In a peroxide curing reaction, a particular reaction-curable functional group is not required. Therefore, preferably, in the present invention, after forming a gelatinous cured layer by subjecting a dehydration condensation reaction-curable or dealcoholizing condensation reaction-curable silicone composition and an organic peroxide to a condensation reaction, the gel layer is heated to perform secondary curing using the organic peroxide.

In particular, when a silicon atom-bonded alkoxy group is used as the reaction-curable group, the reaction-curable group is preferably an alkoxysilyl-containing group with a silicon atom-bond expressed by the following formula.

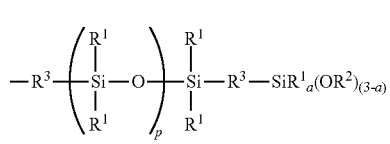

[Formula 1]

In this formula, each $R^1$ is the same or different monovalent hydrocarbon group having no aliphatic unsaturated bond, preferably a methyl group or phenyl group. $R^2$ is an alkyl group used to form a dealcoholizing condensation-reactive alkoxy group, and is preferably a methyl group, ethyl group, or propyl group. $R^3$ is an alkylene group bonded to a silicon atom, and preferably an alkylene group having from 2 to 8 carbon atoms. a is an integer from 0 to 2, and p is an integer from 1 to 50. From the standpoint of dealcoholizing condensation reactivity, a is preferably 0 and a trialkoxysilyl group-containing group is preferred. In addition to the alkoxysilyl group-containing group, a hydrosilylation-reactive functional group or a photopolymerization-reactive functional group may be present in the same molecule.

When the primary curing reaction is a dehydration condensation reaction or a dealcoholizing condensation reaction, a crosslinking agent is not required. However, an organohydrogenpolysiloxane may be included to promote the secondary curing reaction.

When a dehydration condensation reaction or a dealcoholizing condensation reaction is used, a condensation reaction catalyst is preferably used as the curing agent. There are no particular restrictions on the condensation reaction catalyst that is used. Examples include organotin compounds such as dibutyltin dilaurate, dibutyltin diacetate, tin octoate, dibutyltin dioctoate, and tin laurate; organotitanium compounds such as tetrabutyltitanate, tetrapropyltitanate, and dibutoxybis (ethylacetoacetate); acidic compounds such as hydrochloric acid, sulfuric acid, and dodecylbenzene sulfonic acid; alkaline compounds such as ammonia and sodium hydroxide;

and amine compounds such as 1,8-diazabicyclo [5.4.0] undecene (DBU) and 1,4-diazabicyclo [2.2.2] octane (DABCO).

When the primary curing reaction is a peroxide curing reaction, the reaction-curable group may be a radical-reactive functional group using peroxide. There are no particular restrictions on the peroxide reaction-curable functional group. Examples that can be used include alkyl group, alkenyl group, acryl group, or hydroxyl group. However, as mentioned above, because the peroxide curing reaction generally proceeds at a high temperature of 150° C. or higher, in a laminate of the present invention, a peroxide curing reaction is preferably used to cure the silicone gel layer. In other words, it is selected for the secondary curing reaction. This is because the curing reaction for most reaction-curable functional groups is completely terminated under the high temperature conditions of a peroxide curing reaction, including high energy radiation reaction-curable functional groups, and a gelatinous cured product layer is often not obtained. Because some organic peroxides may be inactivated by exposure to high energy radiation, the type of organic peroxide and the amount used are preferably selected based on the primary curing reaction.

When the primary curing reaction is radical reaction curing using high energy radiation, the reaction-curable functional group is a photopolymerizable functional group, including mercaptoalkyl groups such as a 3-mercaptopropyl group, one of the alkenyl groups described above, or an acrylamide group such as an N-methyl acrylamidopropyl group. There are no particular restrictions on the exposure conditions for the high energy radiation. For example, the composition may be exposed in air, in an inert gas such as nitrogen gas, argon gas or helium gas, or in vacuum at room temperature or while applying heat to 50 to 150° C. Exposure in air at room temperature is preferred. Because contact of some photopolymerizable functional groups with air may lead to poor curing, the surface of the curable silicone composition may optionally be coated with a synthetic resin film that transmits high energy radiation when high energy radiation is used. When the curable silicone composition is subjected to primary curing to form of a gel at room temperature using ultraviolet light with a wavelength from 280 to 450 nm, preferably from 350 to 400 nm, a reaction-curable group and curing agent for another curing system involving heat, such as a hydrosilylation curing reaction or peroxide curing reaction, can be left unreacted in the reaction-curable silicone gel layer. As a result, the second curing reaction can be easily controlled by selecting a heat curing reaction as the second curing reaction.

The reaction-curable silicone gel layer is formed from a curable silicone composition comprising an organopolysiloxane having a curable reactive group described above (A), optionally an organohydrogenpolysiloxane (B) depending on the curing reaction, and a curing agent (C). When a hydrosilylation curing reaction used as either the primary curing reaction forming a silicone gel layer of the present invention or the secondary curing reaction forming a cured layer from the silicone gel layer, the curable silicone composition preferably contains a linear organopolysiloxane having at least two reaction-curable groups in the molecule (A-1) and a resinous or branched organopolysiloxane having at least two reaction-curable groups in the molecule (A-2).

Component (A-1) is a linear organopolysiloxane having at least two reaction-curable groups in the molecule. Component (A-1) may be oily or gummy at room temperature, and the viscosity of component (A-1) at 25° C. is 50 mPa·s or more, preferably 100 mPa·s or more. When the curable silicone composition is a solvent-type composition in particular, component (A-1) should be rubbery with plasticity and have a viscosity at 25° C. of 100,000 mPa·s or more. However, a lower viscosity component (A-1) can also be used.

Component (A-2) is a resinous or branched organopolysiloxane having at least two reaction-curable groups in the molecule, preferably a resinous reaction-curable organopolysiloxane (organopolysiloxane resin) having at least two reaction-curable groups in the molecule. Examples of component (A-2) include resins comprising an $R_2SiO_{2/2}$ unit (D unit) and $RSiO_{3/2}$ unit (T unit) (where each R is independently a monovalent organic group or a hydroxyl group) and having at least two reaction-curable groups, hydroxyl groups, or hydrolyzable groups in the molecule, resins comprising T units only and having at least two reaction-curable groups, hydroxyl groups, or hydrolyzable groups in the molecule, and resins comprising an $R_3SiO_{1/2}$ unit (M unit) and $SiO_{4/2}$ unit (Q unit) and having at least two reaction-curable groups, hydroxyl groups, or hydrolyzable groups in the molecule. Resins comprising an $R_3SiO_{1/2}$ unit (M unit) and $SiO_{4/2}$ unit (Q unit) and having at least two reaction-curable groups, hydroxyl groups, or hydrolyzable groups in the molecule (known as MQ resins) are especially preferred. The hydroxyl group or hydrolyzable group is bonded directly a silicon atom in a T unit or Q unit of the resin, and is derived from silane or results from hydrolyzed silane.

The reaction-curable functional group in components (A-1) and (A-2) may be related to the same curing reaction mechanism or different reaction curing mechanism. Components (A-1) and (A-2) may have reaction-curable functional groups with two or more different types of curing reaction mechanism in the same molecule. For example, component (A-1) or component (A-2) may be organopolysiloxanes having a photopolymerizable functional group and/or a hydrosilylation reactive functional group in addition to a condensation reactive functional group in the same molecule, but the structure of component (A-1) is linear and the structure of component (A-2) is resinous or branched. When using a hydrosilylation reaction as either the primary curing reaction or the secondary curing reaction, component (A-2) is preferably included. As mentioned above, component (A-2) is preferably a resinous or branched organopolysiloxane having functional groups related to two or more different types of curing reaction mechanism.

Component (B) is an organohydrogenpolysiloxane optionally having crosslinking component or molecular chain extending component. This component is preferably included when the reaction-curable functional group is an alkenyl group and the curing agent contains a hydrosilylation reaction catalyst. Preferably, component (B) is an organohydrogenpolysiloxane having two or more Si—H bonds in the molecule.

(C) Component (C) is a curing agent, and is preferably one or more type of curing agent selected from the hydrosilylation reaction catalysts, organic peroxides, and photopolymerization initiators mentioned above.

The curable silicone composition can include other components in a range that does not impair the technical effects of a laminate of the present invention. Examples include curing retarders; adhesion promoters; non-reactive organopolysiloxanes such as polydimethylsiloxane or polydimethyldiphenylsiloxane; antioxidants such as phenol-type, quinone-type, amine-type, phosphorus-type, phosphite-type, sulfur-type or thioether-type antioxidants; light stabilizers such as triazoles or benzophenones; flame retardants such as phosphate-type, halogen-type, phosphorus-type, and antimony-type flame retardants; one or more type of antistatic agent such as a cationic surfactant, anionic surfactant, or nonionic surfactant; dyes; pigments; reinforcing fillers; thermally conductive fillers; dielectric fillers; electrically conductive fillers; and release components. By incorporating a dye or a pigment (colorant), the visibility of the reaction-curable silicone gel or resulting cured product can be improved. Some additives may have other functions such as a copper phthalocyanine colorant.

In particular, reinforcing fillers are components that impart mechanical strength to the silicone gel and also improve thixotropy. When the silicone gel layer is heated during the secondary curing reaction, these can prevent softening of the silicone gel layer and deformation or loss of shape retention. These are especially effective making sure an electronic component can be separated from the cured layer when the electronic component is embedded in the silicone gel layer. Reinforcing fillers can also improve mechanical strength, shape retention, and surface releasability of the cured product after the secondary curing reaction. Examples of reinforcing fillers include inorganic fillers such as fumed silica fine powder, precipitable silica fine powder, calcined silica fine powder, fumed titanium dioxide fine powder, quartz fine powder, calcium carbonate fine powder, diatomaceous earth fine powder, aluminum oxide fine powder, aluminum hydroxide fine powder, zinc oxide fine powder, and zinc carbonate fine powder. These inorganic fillers may be surface treated with an organoalkoxysilane such as methyltrimethoxysilane, an organohalosilane such as trimethylchlorosilane, an organosilazane such as hexamethyldisilazane, or a siloxane oligomer such as an α,ω-silanol group-blocked dimethylsiloxane oligomer, α,ω-silanol-blocked methylphenylsiloxane oligomer, or α,ω-silanol group blocked methyl vinyl siloxane oligomer to obtain surface-treated inorganic fillers.

When a hydrosilylation reaction is used either as the primary curing reaction for turning the curable silicone composition into a gel or in the secondary curing reaction for the silicone gel layer, a hydrosilylation reaction inhibitor is preferably included as a curing retarder. Specific examples include alkyne alcohols such as 2-methyl-3-butyn-2-ol, 3,5-dimethyl-1-hexyn-3-ol, 2-phenyl-3-butyn-2-ol, and 1-ethynyl-1-cyclohexanol; enyne compounds such as 3-methyl-3-penten-1-yne and 3,5-dimethyl-3-hexene-1-yne; alkenyl group-containing low molecular weight siloxanes such as tetramethyl tetravinyl cyclotetrasiloxane and tetramethyl tetrahexenyl cyclotetrasiloxane; and alkynyloxysilanes such as methyl-tris (1,1-dimethylpropynyloxy) silane and vinyl-tris (1,1-dimethylpropynyloxy) silane. There are no particular restrictions on the amount of curing retarder that is used, but from 10 to 10,000 ppm relative to the curable silicone composition in terms of mass units is preferred.

The adhesion promoter is preferably an organosilicon compound having at least one alkoxy group bonded to a silicon atom in the molecule. Examples of these alkoxy groups include a methoxy group, an ethoxy group, a propoxy group, a butoxy group, and a methoxyethoxy group. A methoxy group is especially preferred. Examples of groups bonded to silicon atoms other than the alkoxy group in the organosilicon compound include a halogen-substituted or unsubstituted monovalent hydrocarbon group such as an alkyl group, an alkenyl group, an aryl group, an aralkyl group, or a halogenated alkyl group; a glycidoxyalkyl group such as a 3-glycidoxypropyl group or a 4-glycidoxybutyl group; an epoxy cyclohexyl alkyl group such as a 2-(3,4-epoxycyclohexyl) ethyl group or a 3-(3,4-epoxycyclohexyl) propyl group; an epoxy alkyl group such as a 3,4-epoxybutyl group or a 7,8-epoxyoctyl group; an acrylic group-containing monovalent organic group such as a 3-methacryloxypropyl group; and a hydrogen atom. The organosilicon compound preferably has a group able to react with an alkenyl group or a silicon atom-bonded hydrogen atom in the composition, and more preferably a silicon atom-bonded hydrogen atom or an alkenyl group. Also, the organic silicon compound preferably has at least one epoxy group-containing monovalent organic group in the molecule to impart good adhesion to various types of substrate. Examples of these organosilicon compounds include organosilane compounds, organosiloxane oligomers, and alkyl silicates. The molecular structure of the organosiloxane oligomer or alkyl silicate can be linear, partially branched linear, branched, cyclic, or reticulated. A linear, branched, or reticulated structure is preferred. Examples of organosilicon compounds include silane compounds such as 3-glycidoxypropyltrimethoxysilane, 2-(3,4-epoxycyclohexyl) ethyltrimethoxysilane, and 3-methacryloxypropyltrimethoxysilane; siloxane compounds having at least one silicon atom-bonded alkenyl group or silicon atom-bonded hydrogen atom and at least one silicon atom-bonded alkoxy group in the molecule; mixtures of a silane compound or siloxane compound having at least one silicon atom-bonded alkoxy group and a siloxane compound having at least one silicon atom-bonded hydroxy group and at least one silicon atom-bonded alkenyl group in the molecule; methyl polysilicates; ethyl polysilicates; and epoxy group-containing ethyl polysilicates. The adhesion promoter is preferably a low viscosity liquid. There are no particular restrictions on the viscosity, but the viscosity is preferably from 1 to 500 mPa·s at 25° C. There are no particular restrictions on the amount of adhesion promoter that is used, but the amount is preferably in the range of 0.01 to 10 parts by mass per 100 parts by mass curable silicone composition.

Preferably, a laminate of the present invention has an alkenyl group or a photopolymerizable functional group as a reaction-curable group either in the primary curing reaction of the curable silicone composition or in the secondary curing reaction of the silicone gel layer, and contains an organohydrogenpolysiloxane as a crosslinking agent. Preferably, these are cured using a hydrosilylation reaction catalyst. Specifically, a silicone gel layer of the present invention is preferably obtained by curing to gelatinous form a curable silicone composition comprising a linear organopolysiloxane having at least two alkenyl groups or photopolymerizable functional groups in the molecule as a component (A-1), a resinous or branched organopolysiloxane having at least two alkenyl groups or photopolymerizable functional groups in the molecule as component (A-2), an organohydrogenpolysiloxane having at least two silicon atom-bonded hydrogen atoms in the molecule as component (B), and a curing reaction catalyst containing a hydrosilylation reaction catalyst as component (C). Component (C) may also contain an organic peroxide to promote the secondary curing reaction with heat if the reaction-curable functional groups are completely consumed in the primary curing reaction to form a gel.

Here, the amount of each component in the composition should enable the primary curing reaction to form a gel from the curable silicone composition and the secondary curing reaction to be conducted on the silicone gel layer after the primary curing reaction. When the primary curing reaction is a hydrosilylation curing reaction, the amount of silicon atom-bonded hydrogen atoms in component (B) per mole of alkenyl groups in component (A) of the composition is preferably at least 0.25 mol and more preferably at least 0.26 mol.

Here, component (A-1) is preferably a trimethylsiloxy group-endcapped dimethyl siloxane/methyl vinyl siloxane copolymer, a trimethylsiloxy group-endcapped dimethyl siloxane/methyl vinyl siloxane/methyl phenyl siloxane copolymer, a dimethylvinylsiloxy group-endcapped dimethylpolysiloxane, a dimethylvinylsiloxy group-endcapped methylphenyl siloxane, a dimethylvinylsiloxy group-endcapped dimethylsiloxane/methylvinyl siloxane copolymer, a dimethylphenylsiloxy group-endcapped dimethyl siloxane/methyl vinyl siloxane copolymer, or a methylphenylsiloxy group-endcapped dimethylpolysiloxane.

Similarly, component (A-2) is preferably a resinous organopolysiloxane having a hydrosilylation reactive group and/or a radical reactive group when heated in the presence of an organic peroxide and exposure to high energy radiation. Examples include MQ resins, MDQ resins, MTQ resins, MDTQ resins, TD resins, TQ resins, and TDQ resins comprising any combination of a triorganosiloxy unit (M units) (where the organo group is methyl only, methyl and vinyl, or phenyl), a diorganosiloxy unit (D unit) (where the organo group is methyl only, methyl and vinyl, or phenyl), a monoorganosiloxy unit (T unit) (where the organo group is methyl, vinyl, or phenyl), and a siloxy unit (Q unit).

Similarly, component (B) is preferably a dimethyl hydrogensiloxy group-endcapped methylphenylpolysiloxane, a dimethyl hydrogensiloxy group-endcapped dimethyl siloxane/methyl phenyl siloxane copolymer, a dimethyl hydrogensiloxy group-endcapped diphenylpolysiloxane, a trimethyl siloxy group-endcapped methylhydrogenpolysiloxane, a trimethyl siloxy group-endcapped methyl hydrogen siloxane/dimethylsiloxane copolymer, a dimethyl hydrogensiloxy group-endcapped methyl hydrogen siloxane/dimethylsiloxane copolymer, and mixtures of two or more types of these organopolysiloxanes. In the present invention, an example of component (B) is a trimethyl siloxy group-endcapped methyl hydrogen siloxane/dimethylsiloxane copolymer with a viscosity at 25° C. from 1 to 500 mPa·s. Component (B) may also be a resinous organohydrogenpolysiloxane resin.

Similarly, component (C) preferably contains one of the aforementioned hydrosilylation reaction catalysts and one or more curing agents selected from among organic peroxides and photoinitiators depending on the primary curing reaction or secondary curing reaction.

There are no particular restrictions on the application method used to form a reaction-curable silicone gel layer on a substrate. Any method common in the art can be used. Examples include the gravure coating, offset coating, offset gravure coating, roll coating using an offset transfer roll coater, reverse roll coating, air knife coating, curtain coating using a curtain flow coater, comma coating, and Mayer rod coating.

[Combination of Suitable Primary and Secondary Cure Reaction Mechanisms]

In order to obtain a silicone gel layer of the present invention, a curable silicone composition is preferably cured in gelatinous form using a hydrosilylation reaction, dehydration condensation reaction, dealcoholizing condensation reaction, or high energy-radiation radical reaction curing mechanism. Preferred examples include hydrosilylation curing at a low temperature below 100° C., radical reaction curing type at room temperature using high energy radiation, and hydrosilylation curing using high energy radiation.

The secondary curing reaction for the silicone gel layer is preferably a curing reaction that occurs at a high temperature exceeding 100 degrees, and is preferably a hydrosilylation curing or a peroxide curing reaction. As explained above, the secondary curing reaction is preferably controlled using an encapsulated hydrosilylation reaction catalyst under temperature conditions higher than the melting temperature of the thermoplastic resin forming the capsule walls.

[Electronic Component Manufacturing Method]

As mentioned above, a laminate of the present invention is useful in the manufacture of electronic components. By forming a silicone gel on top of an electronic component substrate to form a stable and flat electronic component securing surface with excellent stress relaxation, the portion in which the silicone gel is laminated selectively protects the electronic components from chemical or physical processing. Also, electronic component processing defects are less likely to occur due to substrate surface unevenness, misaligned electronic components, or vibration displacement (damping) during manufacture of the electronic components. When a silicone gel with a sheet-like member laminated on top via an adhesive layer is cured, the sheet-like member and silicone gel cured product are integrated, the silicone gel cured product can be easily, quickly, and reliably peeled off the electronic component together with the sheet-like member even when arranged locally in positions that are difficult to effectively peel off, and defects are not caused due to silicone gel residue (sticky residue).

Specifically, the method for manufacturing an electronic component of the present invention comprises Step (I): Creating a laminate of an electronic component, a reaction-curable silicone gel, and a sheet-like member having an adhesive layer, Step (II): Subjecting the electronic component to one or more types of chemical or physical processing after step (I) (including but not limited to one or more types selected from electronic circuit formation, electrode pattern formation, conductive film formation, and insulating film formation), Step (III): Curing the reaction-curable silicone gel after step (II), and Step (IV): Separating the sheet-like member and the cured product of the reaction-curable silicone gel substantially simultaneously from the electronic component after step (III).

The laminate formation in step (I) is optional. The curable silicone composition may be applied to an electronic component substrate and subjected to primary curing to obtain a gel, or a reaction-curable silicone gel may be formed separately and then transferred to the electronic component substrate.

Here, a sheet-like member may be laminated on the silicone gel after chemical or physical processing has been performed on the electronic component. Therefore, the present invention is preferably a method for manufacturing an electronic component comprising Step (I'): Laminating a reaction-curable silicone gel on an electronic component, Step (II'): Subjecting the electronic component to one or more types of chemical or physical processing after step (I'), Step (III'): Laminating a sheet-like member having an adhesive layer on the reaction-curable silicone gel after step (II'), Step (IV'): Curing the reaction-curable silicone gel after step (III'), and Step (V'): Separating the sheet-like member and the cured product of the reaction-curable silicone gel substantially simultaneously from the electronic component after step (IV').

As explained in the section on laminates including electronic components, the manufacturing method for electronic components in the present invention preferably has a step in which an electronic circuit, electrode pattern, conductive film, or insulating film is formed on top of the electronic component after the silicone gel has been laminated. Also, the laminate or electronic component may be divided into individual units (dicing).

The step in which some or all of the silicone gel layer is cured is the step in which the curable silicone gel layer is subjected to secondary curing. The silicone gel layer changes into a hard cured layer with higher shape retention than before the reaction and excellent release properties. Afterwards, the electronic component arranged in the silicone gel layer is easily separated, and problems such as adhesion of silicone gel or the cured silicone gel product to the substrate or electronic component are less likely to occur.

After laminating a reaction-curable silicone gel on an electronic component (or precursor), the silicone gel and electronic component are preferably diced in an integrated state. When the electronic component is subjected to chemical or physical processing afterwards, the entire surface of the diced electronic component can be effectively processed except for the surface on which the silicone gel has been applied. When the silicone gel cured product is then removed, individual electronic components are obtained in a processed and separate state.

EXAMPLES

The following is a description of the present invention with reference to examples. Note that the present invention is not limited to these examples. The following compounds and compositions are used in the examples.

Component (A1-1): Vinyl dimethylsiloxy group-endcapped dimethylsiloxane polymer (siloxane polymerization degree: approx. 540, vinyl group content: about 0.13 wt %)

Component (A1-2): Vinyldimethylsiloxy group-endcapped dimethylsiloxane polymer (siloxane polymerization degree: approx. 315, vinyl group content: about 0.22 wt %)

Component (A1-3): Trimethylsiloxy-endcapped dimethylsiloxane/vinylmethylsiloxane copolymer (siloxane polymerization degree: approx. 816, vinyl content: about 0.29 wt %)

Component (A2): Resinous organopolysiloxane with vinyldimethylsiloxy-capped Q unit (vinyl content: approx. 4.1 wt %)

Component (B1): Hydrogen dimethylsiloxy group-endcapped dimethylsiloxane polymer (siloxane polymerization degree: approx. 20, silicon atom-bonded hydrogen group content: 0.12 wt %)

<Hydrosilylation Reaction Inhibitor>

Component (C1): 1,3,5,7-tetramethyl-1,3,5,7-tetravinyl-cyclotetrasiloxane (vinyl content: 30.2 wt %)

<Filler>

Component (D1): hexamethyldisilazane-treated silica fine particles (Aerosil 200V from Nippon Aerosil)

<Curing Agent>

Component (E1): a vinylsiloxane solution of a platinum/divinyltetramethyldisiloxane complex (approx. 0.6 wt % in terms of platinum metal concentration)

Component (E2): Mixture of 2,5-dimethyl-2,5-di (t-butylperoxy) hexane and trimethylsiloxy-endcapped siloxane polymer (2,5-dimethyl-2,5-di (t-butylperoxy) hexane concentration: approx. 50 wt %)

Composition: Example 1

Components A1-1 (9.76 wt %), A1-2 (5.93 wt %), A1-3 (60.42 wt %), A2 (6.61 wt %), B1 (13.02 wt %), C1 (0.10 wt %), D1 (2.08 wt %), E1 (0.07 wt %) and E2 (2.00 wt %) were mixed together uniformly to obtain a curable liquid silicone composition. At this time, the amount of silicon atom-bonded hydrogen atoms (Si—H) in component (B1) was 0.85 mol per mol of vinyl groups. In addition to these components, an appropriate amount of colorant was used in this example to facilitate confirmation of releasability.

Composition: Example 2

Components A1-1 (9.87 wt %), A1-3 (66.27 wt %), A2 (6.69 wt %), B1 (8.74 wt %), C1 (0.10 wt %), D1 (6.25 wt %), E1 (0.07 wt %) Wt %) and E2 (2.00 wt %) were mixed together uniformly to obtain a curable liquid silicone composition. At this time, the amount of silicon atom-bonded hydrogen atoms (Si—H) in component (B1) was 0.56 mol per mol of vinyl groups. In addition to these components, an appropriate amount of colorant was used in this example to facilitate confirmation of releasability.

[Reactive Gel Preparation Condition and Appearance]

A hydrosilylation reaction was conducted by heating the liquid silicone composition for two hours prior to curing at 80° C. to obtain a gel. The resulting reaction-curable silicone gel was clear in the absence of colorant.

[Secondary Cured Product Preparation Conditions]

The resulting reaction-curable silicone gel was subjected to secondary curing in nitrogen at 150° C. (Example 2) or 170° C. (Example 1) for one hour to obtain a secondary cured product.

[Measurement of Viscoelasticity]

Reaction-Curable Silicone Gel

The uncured liquid silicone composition was placed in an aluminum container (diameter 50 mm) to a depth of about 1.5 mm, and a test sample with a diameter of 8 mm was cut from the reaction-curable silicone gel obtained under the conditions described above. The sample was affixed to a parallel plate with a diameter of 8 mm and measured using an MCR 302 viscoelasticity measuring device (from Anton Paar). The test was performed at 23° C., a frequency of 0.01 to 10 Hz, and a strain of 0.5%.

Example 1: The storage modulus at 0.1 Hz was $6.1 \times 10^4$ Pa, and the loss tangent (loss modulus/storage modulus) was 0.03.

Example 2: The storage modulus at 0.1 Hz was $3.9 \times 10^4$ Pa, and the loss tangent (loss modulus/storage modulus) was 0.05.

Secondary Cured Product

A reaction-curable silicone gel was prepared in the manner described above using an aluminum container. A secondary cured product was then obtained under the conditions described above. A test sample with a diameter of 8 mm was cut from the secondary cured product. The sample was affixed to a parallel plate with a diameter of 8 mm and measured using an MCR 302 viscoelasticity measuring device (from Anton Paar). The test was performed at 23° C., a frequency of 0.01 to 10 Hz, and a strain of 0.1%.

Example 1: The storage modulus at 0.1 Hz was $1.0 \times 10^5$ Pa.

Example 2: The storage modulus at 0.1 Hz was $8.4 \times 10^4$ Pa.

[Release of Secondary Cured Product]

The uncured liquid silicone composition was spin-coated on a substrate at room temperature to produce a curable gel layer on the substrate under the conditions described above. Adhesive tape (Nitroflon No. 903UL from Nitto Denko) was affixed to the resulting reaction-curable gel layer, and the reaction-curable silicone gel was subjected to secondary curing in nitrogen at 150° C. or 170° C. for one hour. The adhesive tape was peeled off the substrate including the secondary cured product prepared above, and it was visually confirmed that the secondary cured product had been transferred to the adhesive tape.

<Comparative Testing>

The uncured liquid silicone composition was spin-coated on a substrate at room temperature to produce a curable gel layer on the substrate under the conditions described above except that adhesive tape was not used, and the reaction-curable silicone gel was subjected to secondary curing in nitrogen at 150° C. or 170° C. for one hour. However, when there was no adhesive tape, the secondary cured product could not be effectively peeled off (separated from) the substrate.

Adhesive Test with Adhesive Sheet

Thin coatings of Primer X and Primer Y (both from Dow Corning) were applied to an aluminum substrate. The uncured liquid silicone composition described in Example 2 was applied on top to a thickness of about 230 μm, and cured in the manner described above to obtain an elastomer. Adhesive tape (No. 336 from Nitto Denko) was affixed to the elastomer, and a reaction with the adhesive layer was conducted under heat for one hour at 150° C. in a nitrogen atmosphere. After storage for 30 minutes, a 180° peel test was performed at a speed of 300 mm/min under conditions of 23° C. and 50% relative humidity using the RTC 1210 (from Orientec). The peel strength was 165 N/m, and the peeling mode was cohesive failure. When adhesive tape was affixed to the elastomer in the same manner as above after being heated in a nitrogen atmosphere at 150° C. for one hour, the peel strength was 135 N/m, and the peeling mode was interfacial peeling. Thus, it was confirmed that a strong bond had been formed at the interface between the reaction-curable elastomer and the adhesive tape due to the aforementioned secondary curing reaction. This combination is removable from the substrate with the adhesive tape as an integrated unit.

The invention claimed is:

1. A method for manufacturing an electronic component, said method comprising the steps of:
    (I) creating a laminate of an electronic component (L1-E), a reaction-curable silicone gel, and a sheet-like member having an adhesive layer;
    (II) chemically or physically processing the electronic component (L1-E) after step (I);
    (III) curing the reaction-curable silicone gel after step (II); and
    (IV) separating the sheet-like member and the cured product of the reaction-curable silicone gel substantially simultaneously from the electronic component (L1-E) after step (III).

2. The method for manufacturing an electronic component according to claim 1, further comprising the step of dicing the silicone gel and the electronic component in an integrated form after step (I).

3. The method for manufacturing an electronic component according to claim 1, wherein the loss tangent tan δ of the reaction-curable silicone gel at 23° C. to 100° C. is in a range from 0.01 to 1.00.

4. The method for manufacturing an electronic component according to claim 1, wherein the storage modulus $G'_{cured}$ of the cured product of the reaction-curable silicone gel obtained from curing of the reaction-curable silicone gel increases by at least 50% compared to the storage modulus $G'_{gel}$ of silicone gel prior to curing.

5. The method for manufacturing an electronic component according to claim 1, wherein the processing of step (II) is further defined as forming an electronic circuit, forming an electrode pattern, forming an conductive film, or forming an insulating film.

6. A method for manufacturing an electronic component, said method comprising the steps of:
    (I') laminating a reaction-curable silicone gel on an electronic component (L1-E);
    (II') chemically or physically processing the electronic component (L1-E) after step (I');
    (III') laminating a sheet-like member having an adhesive layer on the reaction-curable silicone gel after step (II');
    (IV') curing the reaction-curable silicone gel after step (III'); and
    (V') separating the sheet-like member and the cured product of the reaction-curable silicone gel substantially simultaneously from the electronic component (L1-E) after step (IV').

7. The method for manufacturing an electronic component according to claim 6, further comprising the step of dicing the silicone gel and the electronic component in an integrated form after step (I').

8. The method for manufacturing an electronic component according to claim 6, wherein the loss tangent tan δ of the reaction-curable silicone gel at 23° C. to 100° C. is in a range from 0.01 to 1.00.

9. The method for manufacturing an electronic component according to claim 6, wherein the storage modulus $G'_{cured}$ of the cured product of the reaction-curable silicone gel obtained from curing of the reaction-curable silicone gel increases by at least 50% compared to the storage modulus $G'_{gel}$ of silicone gel prior to curing.

10. The method for manufacturing an electronic component according to claim 6, wherein the processing of step (II') is further defined as forming an electronic circuit, forming an electrode pattern, forming an conductive film, or forming an insulating film.

* * * * *